Sept. 2, 1941.  H. G. BERGER ET AL  2,254,597
METHOD OF SEPARATING PARAFFIN WAX FROM OIL
Filed Dec. 29, 1938
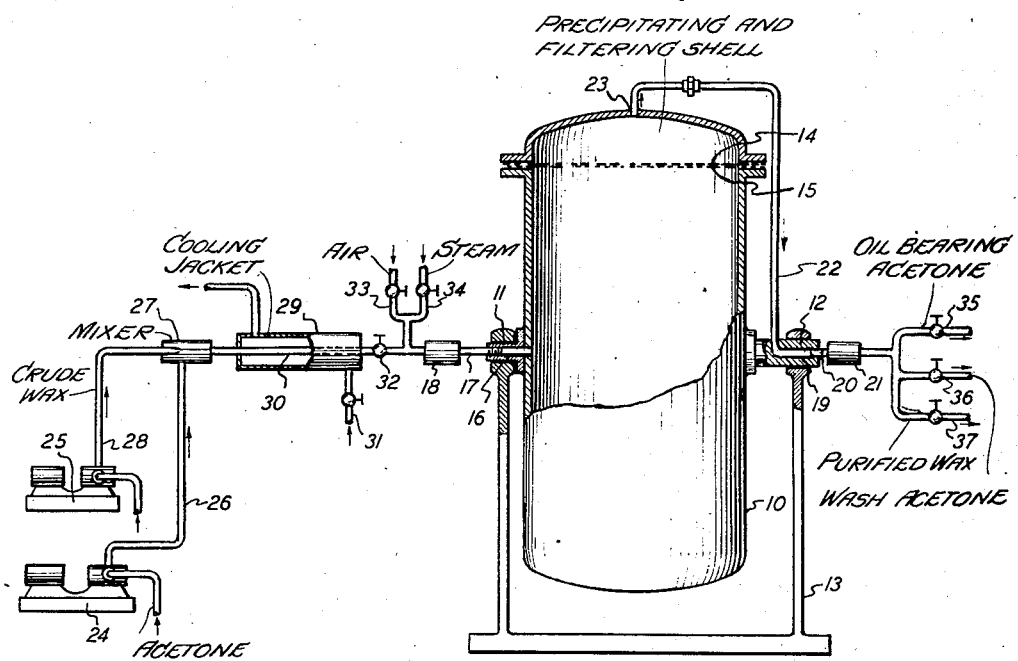
HENRY G. BERGER
GERALD M. FISHER
FREDRICK C. RUFF
INVENTORS
ATTORNEY Patented Sept. 2, 1941

2,254,597

UNITED STATES PATENT OFFICE 2,254,597

METHOD OF SEPARATING PARAFFIN WAX FROM OIL

Henry G. Berger, Woodbury, N. J., and Gerald M. Fisher and Frederick C. Ruff, Los Angeles, Calif., assignors to Socony-Vacuum Oil Company, Incorporated, New York, N. Y., a corporation of New York Application December 29, 1938, Serial No. 248,194

1 Claim. (Cl. 196—19)

It is well known in the art of manufacturing paraffin waxes to separate wax from the accompanying oil by the use of acetone or of mixtures of acetone with benzol. If the proportion of oil be small, it is also known to dissolve the wax in a light petroleum product such as rubber solvent before mixing it with acetone. The high melting point paraffins are substantially insoluble in acetone at normal temperatures, and the addition of this body to a solution of wax in petroleum distillate or benzol causes the wax to separate. For the same reason, a mixture of benzol or petroleum distillate with acetone in suitable proportions dissolves oil entrained in the wax, and this raises its melting point, without dissolving any material quantity of the wax.

In applying this old art to the actual manufacture of high melting point waxes, a serious practical difficulty has been encountered, in that the wax is precipitated from solution in the form of flakes which form an impermeable mass on the cloths of a filter press and cannot be washed free from adhering oil solution. As this step is necessary to the ultimate separation of the oil from wax, the long known step of acetone fractionation has never come into extended commercial use.

We have discovered that this difficulty may wholly be avoided, and the wax brought to a finely granular condition in which it may readily be filtered and washed, by spraying or injecting, in fine streams, a molten wax or a solution of wax or even an oil containing a material proportion of wax into a body or flowing stream of acetone alone or acetone mixed with a solvent for oil.

In a preferred manner of application it is proposed to process such residues as may settle in crude oil storage tanks previously freed by suitable treating methods of contained asphalt and other impurities. Such materials are known, which, when freed of the aforementioned impurities, comprise mainly waxes ranging upwards of 160° F. melting point. In admixtures therewith may be anywhere from 5 to 20% of oil. Such a high concentration of wax of the character stated may effectively and economically be freed of its oil content by injection at a temperature slightly above its melting point into a flow stream or retained body of acetone or a mixture thereof with benzol. Precipitation in a granular form results in an ideal manner for drainage of the solvents containing the extracted oil. Subsequent washing and removal of the last traces of oil and solvent are readily effected.

For charge materials of the character cited, it is evident that this constitutes a very practical and novel means of removing oil without the use of excessive volumes of oil solvent. In many of the current uses for high melting point waxes it is essential that the last traces of oil be removed in order to insure a tasteless and odorless product. Also, the difference of a few degrees in melting point may mean the sale or non-sale of a particular grade of wax. This method affords the most practical and economical means for the ultimate removal of oil to thus insure a product possessing the highest degree of purity. In certain cases treatment by the outlined procedure has been known to raise the melting point of the original stock by in excess of 10 degrees. While this would not be of consequence for the ordinary slack wax, it is of great importance in the production of high melting point waxes. While we recognize the particular application is of major consequence for the production of special waxes for specific use, the process under certain conditions may find utilization in the treatment of more conventional wax bearing stocks.

In one such manner of procedure a slack wax having a low melting point is dissolved in more or less an equal volume of light and clean petroleum distillate, using heat if necessary and then cooling to atmospheric temperature. This solution is then injected in a very fine, high velocity stream (or a plurality of such streams) into a flowing stream of acetone, preferably under conditions of turbulence which produce rapid and complete intermixture of the two liquids.

The wax is instantly precipitated in the form of very small, free filtering granules, and the mixed stream may be passed directly into any suitable filter, a desirable form for which is suggested herein.

In another modification a soft wax containing a large proportion of oil, such as petrolatum, is brought to a temperature very slightly above its melting point and injected, in the molten condition but otherwise in the manner above described, into a flow stream or a retained body of a benzol+acetone mixture, with the same result as to the precipitation of the wax in granular and free filtering form.

It is also possible to effect the desired granulation by injecting molten wax, free from solvent, into a stream consisting entirely of acetone, the results produced being substantially the same. It should be noted, however, that if the wax be molten or a solution thereof be materially above atmospheric temperature, it will be necessary to apply a cooling effect to the mixed stream to avoid solution of wax in the acetone. It should also be observed that where a molten or dissolved wax is injected into a body rather than a flowing stream of acetone, the injected stream or streams should be so directed as to produce rapid circulation of the acetone body and continuous intermixture of the two liquids.

For the practical application of this process we have devised the apparatus illustrated in the attached drawing. Referring to the drawing, 10 is a precipitating and filtering shell suspended on trunnions 11—12 from any convenient frame 13. The trunnions are so placed that the position of the shell may be reversed, end for end.

In one end of the shell is placed a rigid support 14, such as perforated plate, for a filtering element 15, such as filter cloth. Any desired arrangement of filtering media may be used.

Trunnion 11 is hollow throughout its length as at 16 and this bore terminates in a stub pipe 17 rotatable in a swivel joint 18. Trunnion 12 is hollow for only part of its length, as at 19, and this bore terminates in a stub pipe 20 rotatable in a swivel joint 21 and is also connected by a pipe 22 with an opening 23 in the center of the upper head (as shown) of shell 10.

Two pumps, indicated at 24 and 25, are provided. Pump 24 draws acetone from a source of supply not shown and discharges it in a stream through pipe 26 into a mixer 27 which may be a mere shell as shown or may be a venturi or may be provided with internal baffles. Pump 25 draws molten or dissolved wax from a source of supply not shown and discharges it in a stream through pipe 28 into mixer 27. Unless the mixer is provided with means such as baffles for producing turbulence and intermixture, it is desirable to terminate pipe 28 within the mixer in a fine jet or a plurality of such jets or orifices.

In case molten or heated wax or solution is to be injected, the stream leaving the mixer should be passed through a cooling device, symbolized at 29 as a water jacket surrounding discharge pipe 30 and supplied with cooling water through pipe 31. Pipe 30, leading to swivel joint 18 and through it to the interior of tank 10, should be provided with a stop valve or cock 32 and also with a branched side inlet 33—34 for admitting respectively compressed air or other dry gas and dry steam to the interior of the tank.

This apparatus is used in the following manner. The tank being placed in the position shown, with the filtering medium at its upper end, the two pumps are started and the resulting suspension of precipitated wax passes through trunnion 11 into the filtering tank, which is gradually filled. As soon as the level of the suspension reaches the filtering medium, the liquid passes through and is discharged through pipe 22, trunnion 12, and branch outlet pipe 35, which leads to a point of collection or storage of filtrate. The tank is maintained in this position until it has accumulated the desired quantity of wax, a large proportion of the suspended wax settling in the tank during filtration; so that the wax cake on the filtering medium accumulates but slowly.

When filtration has been completed, the position of tank 10 is reversed, bringing outlet 23 to the bottom. Valve 32 is then closed and valve 33 is carefully opened, admitting a controlled supply of air to the interior of the tank and displacing its liquid contents through the filtering medium and through pipe 35 to the filtrate collection point.

As soon as air appears at the outlet, indicating the complete displacement of solution from the wax cake, the air supply is interrupted, valve 32 is opened, and pump 24 started, introducing a supply of clean acetone to the tank for washing the cake free of adhering oil solution. The wash liquid is preferably discharged through pipe 36 into a tank reserved for that purpose, as the wash liquor may be mixed with fresh acetone for treating another batch of wax while the first filtrate must be fractionated to free it from dissolved oil before it can be reused. Washing is continued, with or without interruptions for blowing the cake dry, until the effluent is entirely or sufficiently free from dissolved oil. The recited blowing of the cake between filtration and the first wash may be omitted, but with the result of the consumption of a greater quantity of wash acetone. As a final step the washed wax is blown dry in the manner described.

The wax being now in the form of a cake substantially free from acetone, steam may be admitted to the interior of the tank through pipe 34 to melt the wax and to discharge it through pipe 37 into a tank reserved for the collection of wax. If the introduction into the wax of condensed water is considered undesirable, the tank may be steam jacketed or provided with closed heating coils.

We claim as our invention:

The method of freeing paraffin wax from accompanying hydrocarbon oils which comprises: bringing said wax to a liquid condition; introducing a high velocity stream of said liquid wax into a flowing stream of an oil solvent consisting at least in part of acetone; retarding the velocity of said mixed flowing stream in a collected body of said mixture and settling precipitated wax from solvent in said body; filtering solvent upwardly out of said collected body; reversing the position of said body, and expelling the remainder of said solvent downwardly from the wax collected in said body by said settlement and filtration.

HENRY G. BERGER.
GERALD M. FISHER.
FREDERICK C. RUFF.